US012127562B2

(12) United States Patent
Pierce et al.

(10) Patent No.: US 12,127,562 B2
(45) Date of Patent: Oct. 29, 2024

(54) METHODS AND COMPOSITIONS THAT INCREASE PESTICIDAL ACTIVITY FOR FR901228

(71) Applicant: PRO FARM GROUP, INC., Davis, CA (US)

(72) Inventors: Brittany Pierce, Davis, CA (US); Scott Burman, Davis, CA (US)

(73) Assignee: Pro Farm Group, Inc., Davis, CA (US)

(*) Notice: Subject to any disclaimer, the term of this patent is extended or adjusted under 35 U.S.C. 154(b) by 322 days.

(21) Appl. No.: 17/533,404

(22) Filed: Nov. 23, 2021

(65) Prior Publication Data

US 2022/0183300 A1 Jun. 16, 2022

Related U.S. Application Data

(60) Provisional application No. 63/123,580, filed on Dec. 10, 2020.

(51) Int. Cl.

| | |
|---|---|
| *A01N 63/50* | (2020.01) |
| *A01N 37/46* | (2006.01) |
| *A01N 63/20* | (2020.01) |

(52) U.S. Cl.

CPC ............ *A01N 63/50* (2020.01); *A01N 37/46* (2013.01); *A01N 63/20* (2020.01)

(58) Field of Classification Search

CPC ........ A01N 63/50; A01N 37/46; A01N 63/20; A01P 7/04

See application file for complete search history.

(56) References Cited

U.S. PATENT DOCUMENTS

| | | | | |
|---|---|---|---|---|
| 9,701,673 | B2 * | 7/2017 | Asolkar | A01N 43/90 |
| 11,793,201 | B2 * | 10/2023 | Asolkar | A01N 43/86 |
| 2011/0207604 | A1 * | 8/2011 | Asolkar | C07D 263/32 514/459 |
| 2020/0288715 | A1 * | 9/2020 | Asolkar | C07D 407/06 |
| 2022/0304312 | A1 * | 9/2022 | Asolkar | C12P 17/14 |

OTHER PUBLICATIONS

Thomas et al. ClpB and HtpG faciliate de novo protein folding in stressed *Escherichia coli* cells. Molecular Microbiology, vol. 36, No. 6, pp. 1360-1370 (Year: 2000).*

* cited by examiner

*Primary Examiner* — Marcela M Cordero Garcia

(74) *Attorney, Agent, or Firm* — Dentons Durham Jones Pinegar; Sarah W. Matthews

(57) ABSTRACT

The present invention includes methods and compositions that produce greater pesticidal activity in FR901228 conjugates. FR901228 can be conjugated with one or more thiol containing molecules and produce a new conjugate that exhibits increase pesticidal activity than FR901228 alone.

18 Claims, 1 Drawing Sheet

Specification includes a Sequence Listing.

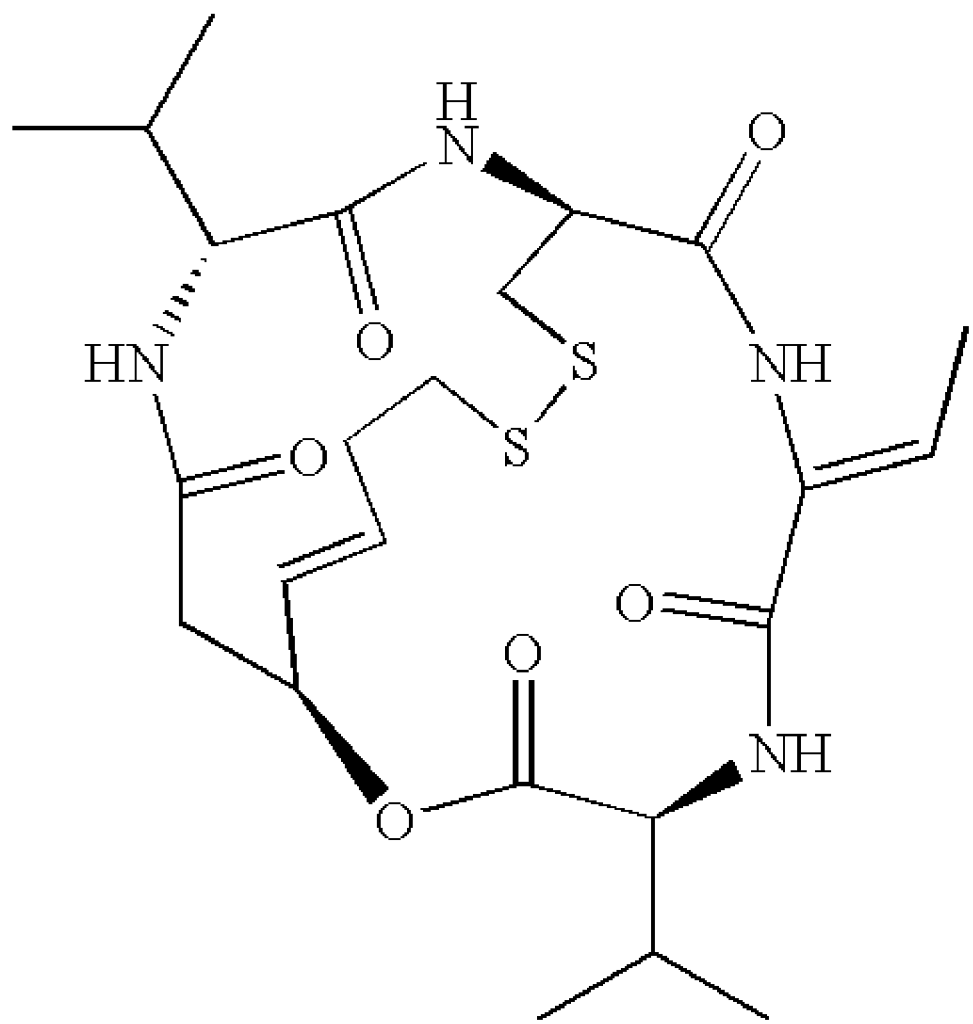

METHODS AND COMPOSITIONS THAT INCREASE PESTICIDAL ACTIVITY FOR FR901228

CROSS-REFERENCE TO RELATED APPLICATIONS

This application claims the benefit of U.S. Provisional Patent Application Ser. No. 63/123,580 filed on Dec. 10, 2020 and is incorporated herein by reference.

TECHNICAL FIELD OF THE INVENTION

The present invention relates in general to the field of pesticides.

BACKGROUND OF THE INVENTION

Without limiting the scope of the invention, its background is described in connection with pesticides. More specifically, methods and compositions that increase pesticidal activity of FR901228.

FR901228 is a known molecule that can be isolated from microbes such as *Chromobacterium* sp., or more particularly, *Chromobacterium violaceum* WB968 strain (FERM BP-1968) in nutrient medium and has been found to be an antibacterial agent and/or antitumor agent (see, for example, U.S. Pat. No. 7,396,665, which is incorporated herein in its entirety). In addition, FR901228 can also be isolated from *Burkholderia* sp. such as *Burkholderia rinojensis* A396 and is known to be pesticidal (see, for example, U.S. Pat. No. 9,701,673 B2, which is incorporated herein in its entirety).

In addition to the fermentation method mentioned above, it is known that FR901228 can also be prepared by semi-synthesis or whole synthesis utilizing techniques known in the art (J. Am. Chem. Soc., 118, 7237-7238 (1996)).

Although FR901228 is known to be pesticidal, there is a need to further improve its pesticidal activity. As such, the present disclosure relates to methods and compositions that increases the pesticidal activity of FR901228.

SUMMARY OF THE INVENTION

In an aspect, the present invention relates to methods for increasing pesticidal activity of FR901228 comprising conjugating the FR901228 with one or more thiol molecule, wherein said thiol molecule comprises at least one thiol functional group in its chemical structure, and wherein the FR901228 and the one or more thiol molecule are linked via at least one disulfide bond, and wherein said conjugated molecule exhibits increased pesticidal activity as compared to FR901228 alone.

In an embodiment, said pesticidal activity mentioned for the above method includes virucidal, herbicidal, germicidal, fungicidal, nematicidal, bactericidal and/or insecticidal activity.

In an aspect, said one or more thiol molecule is a protein and/or a peptide. Non-limiting examples include protein HtpG and/or DnaK. In an embodiment, the protein HtpG and/or DnaK are from *Burkholderia* A396 NRRL Accession No. B-50319.

Yet in another aspect, said FR901228 is derived or isolated from one or more microbe or *E. coli*. In another embodiment, the FR901228 is chemically synthesized.

In an aspect, said microbe comprises *Chromobacterium* sp. and/or *Burkholderia* sp. Non-liming examples include *Chromobacterium violaceum* WB968 strain. *Burkholderia* A396 NRRL Accession No. B-50319.

In one embodiment, the present invention relates to a pesticidal combination comprising FR901228 and one or more thiol molecule, wherein said FR901228 and said one or more thiol molecule are chemically linked through one or more disulfide bond, and wherein said combination exhibits increased pesticidal activity as compared to FR901228 alone.

In an embodiment, said pesticidal activity for the above-mentioned combination includes virucidal, herbicidal, germicidal, fungicidal, nematicidal, bactericidal and/or insecticidal activity.

In an aspect, the pesticidal combination mentioned above, wherein said one or more thiol molecule is a protein and/or a peptide. Non-limiting examples include protein HtpG and/or DnaK. In one embodiment, the protein HtpG and/or DnaK are from *Burkholderia* A396 NRRL Accession No. B-50319.

Yet in another aspect, the pesticidal combination mentioned above, wherein said FR901228 is chemically synthesized.

BRIEF DESCRIPTION OF THE DRAWINGS

For a more complete understanding of the features and advantages of the present invention, reference is now made to the detailed description of the invention along with the accompanying FIGURES and in which:

FIG. 1 denotes the chemical structure of FR901228.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity but include the general class of which a specific example may be used for illustration. The terminology herein is used to describe specific embodiments of the invention, but their usage does not delimit the invention, except as outlined in the claims.

As used herein, the term "pesticidal" or "pesticidal activity" includes, but are not limited to: virucidal, herbicidal, germicidal, fungicidal, nematicidal, bactericidal and/or insecticidal activity.

As used herein, the term "conjugating" or "conjugated" refers to physically attaching two or more molecules together via chemical bonds. The method of attaching could be via traditional chemical synthesis routes or simply by placing two molecules together in a suitable environment (e.g., by in close proximity and/or by supplying heat) where the attachment can take place. A non-limiting example of conjugating is via disulfide bonds when both molecules have available thiol functional group(s) present in their chemical structure that can be linked.

As used herein, FR901228 is also known as romidepsin and has the chemical structure as denotes in FIG. 1. In the present disclosure, the terms "FR901228", "MW 540" and "romidepsin" are used interchangeably as they refer to the same molecule.

The term "peptide" as used in this disclosure refers amino acid sequences that are typically shorter in nature, as compared to a protein. Both protein and peptide are made up of amino acids, and the present disclosure merely denotes their typical difference in length as understood by one skilled in the art.

In one embodiment, the present disclosure relates to methods and compositions that increases pesticidal activity of FR901228. MW 540 contains a disulfide bond capable of interacting with thiol residues of cysteine-containing proteins (Sevier and Kaiser 2002) or molecules (large or small), forming more disulfide bonds. These disulfide bond-scrambling reactions are prompted, for example, by heat. The present inventors isolated MW 540 and conjugated MW 540 with one or more thiol molecules that contain one or more thiol functional group via the formation of disulfide bond(s). The present inventors found that this newly formed conjugated molecule has higher pesticidal activity as compare to MW 540 alone. For example, the insecticidal activity can be increased as compared to MW 540 alone.

In one embodiment, MW 540 can conjugate with any thiol molecule(s) that contain one or more thiol function groups. MW 540 itself has a disulfide bond, and the sulfur atom(s) can interact with another molecule's thiol group and form one or more disulfide bonds. It is known in the art that MW 540 can interact with itself to form dimer, trimer . . . etc. since each molecule can interact with itself via disulfide bonds.

A non-limiting example of another molecule with thiol groups is a protein having cystine residues. A non-limiting example of a protein having cystine residues is chaperone protein HtpG from *Burkholderia rinojensis* A396 having the following amino acid sequence:

(SEQ ID No.: 1)

```
MTQQTMSFQAEVKQLLHLMIHSLYSNKEIFLRELVSNASDAADKLRFEAL

ENGALYENDPNLRIRIGFDPAARTLTIDDNGIGMSRDEAIANLGTIARSG

TKEFFSKLSGDQQKDAALIGQFGVGFYSGFIVADRITVETRRAGLPASEG

VRWESGGEGDFSIDAIERAARGTTITLHLREGEDELLSAHRLKSIVRKYS

DHVALPILMQQEAWDAEKGEMVAKDEDETVNQASALWTRAKSEITDEQYQ

QFYQHLAHDHQNPLAWTHNRVEGRSEYTQLLYVPSHAPFDLWNRDYRGGL

KLYVKRVFIMDDAEQLLPQYLRFVKGVVDSADLPLNVSREILQESRDVKA

IREGVTKRALSMLEELANAEDDAGKEQYRTFWSAFGQVLKEGVGEDQANR

ERVAKLVRFASTHGGTDAQDVSLADYVARMKPEQTRIYYVTADTWQAATH

SPHLEVFRKKGVEVLLLTDRVDEWMLSYLQEFDGKPLASVARGDLDLGAL

DDAEKKAQEETGEAFKPLVEKMKEALGDKAKDVRVTFRLTDSPSCLVADD

HDMSGYLQRMLKAAGQSGPAMQPILEVNPEHPLVKQLQADSPEFGDWCHL

LFDQALLAEGGALEDPASFVKRTNTLLLSRAA.
```

Another non-limiting example of a protein having cystine residues is chaperone protein DnaK from *Burkholderia rinojensis* A396 having the following amino acid sequence:

(SEQ ID No.: 2)

```
MGKIIGIDLGTTNSCVAVMEGNQVKVIENSEGARTTPSIIAYMDDNEVLV

GAPAKRQSVTNPRNTLFAVKRLIGRRFEEKEVQKDIGLMPYAIIKADNGD

AWVEAHGDKLAPPQVSAEVLRKMKKTAEDYLGEPVTEAVITVPAYFNDSQ

RQATKDAGRIAGLEVKRIINEPTAAALAFGLDKAEKGDRKIAVYDLGGGT

FDVSIIEIADVDGEMQFEVLSTNGDTFLGGEDFDQRIIDYIIGEFKKEQG

VDLSKDVLALQRLKEAAEKAKIELSSGQQTEINLPYITADASGPKHLNLK

ITRAKLEALVEELVERTIEPCRIAIKDAGVKVSDIDDVILVGGQTRMPKV

LEKVKEFFGKDPRRDVNPDEAVAVGAAIQGQVLSGDRKDVLLLDVTPLSL

GIETLGGVMTKMINKNTTIPTKHAQVYSTADDNQGAVTIKVFQGEREMAA

GNKLLGEFNLEGIPPAPRGVPQIEVTFDIDANGILHVGAKDKATGKENKI

TIKANSGLSEAEIDQMIKDAEANAAEDHKLRELADSRNQGDALVHSTKKA

VAEYGDKLDAGEKDKIEAALKELEDVLKNTSADKAAIDAKIEALSTASQK

LGEKMYADMQAQQAGAAGAAGAAEGAAHGGAQQADDVVDADFKEVKKD.
```

Additional molecules having thiol functional groups are contemplated by this disclosure and can conjugate with 1\4W 540. Non-limiting example include GroES and GroEL heat shock chaperone proteins.

In one embodiment, the thiol containing molecule can be chemically synthesized or derived from microbes and are in the free form. In another embodiment, the thiol containing molecule can reside on a microbe's cell wall. MW 540 can be added to the above-mentioned cell wall to increase the pesticidal activity of MW 540.

EXAMPLES

Example 1

In bacteria such as *E. coli*, chaperonins (proteins that aid the assembly and folding of other protein molecules in living cells) are produced during heat exposure (often described as heat-shocking). Cytosolic chaperonins, including HtpG and/or DnaK, were evaluated in this example. The proteins can be overexpressed in *E. coli* as a method of production. These proteins contain 2 cysteines that have reactive thiol side-chains and can bind to MW 540.

The present inventors evaluated whether these two proteins can form conjugates with MW 540 and whether the conjugate has the same insecticidal activity as MW 540 alone. One skilled in the art knows that protein purification often uses polyhistidine-tags to assist with the concentration and removal of desired proteins from cellular material. The two protein sequences were cloned into an expression vector (pET26b(+)) and over-expressed in *E. coli* BL21 cells with a His tag added to the C-terminus of the sequence. In other words, His-tagged HtpG and DnaK from *B. rinojensis* A396 were overexpressed in *E. coli* and were purified by immobilized metal ion affinity chromatography. Since *E. coli* does not produce MW540 or have insecticidal activity against *Spodoptera exigua*, it is a suitable surrogate for these experiments.

After mixing MW 540 with HtpG and/or DnaK, heat was applied to the mixture to from disulfide bond conjugates and the end-product was evaluated and its insecticidal activity determined. Quantification of MW 540 and derivatives before and after heating in the presence of recombinant HtpG and DnaK are shown in Table 1 below. Note that MW 540 is capable of forming a dimer or trimer with another MW 540 via disulfide bonds. Therefore, the dimers are designated as MW1080, and the trimer is designated as MW 1620 . . . etc.

The protein type is not specific to *B. rinojensis* A396.

It is contemplated that any embodiment discussed in this specification can be implemented with respect to any method, kit, reagent, or composition of the invention, and vice versa. Furthermore, compositions of the invention can be used to achieve methods of the invention.

TABLE 1

| | Before heating | | | After heating | | |
|---|---|---|---|---|---|---|
| | Free MW540 | MW540/ 1080/1620 | MW540 conjugate | Free MW540 | MW540/ 1080/1620 | MW540 conjugate |
| HtpG + MW540 | 31 | 36.9 | Not detected | 9.7 | 20.4 | 17.0 |
| DnaK + MW540 | 37 | 44.1 | Not detected | 16 | 25.3 | 19.5 |

Table 1 shows that the conjugates were formed. Table 1's numbers are expressed as protein concentrations as µg/mL. Subsequently, the insecticidal activity of the end products was evaluated using Beet army worm diet overlay assay known in the art. See, for example, U.S. Pat. No. 9,701,673 B2.

As shown in Table 2 and Table 3 below, both end products of HtpG and DnaK plus MW 540 conjugates have increased insecticidal activity as compared to MW 540 alone. Control experiments were also performed, where Table 4 shows that the HtPG and DnaK alone does not exhibit insecticidal activity by itself.

TABLE 2

| Sample | MW 540 Concentration (µg/mL) | Protein Concentration (mg/mL) | $LC_{50}$ (µg/mL MW 540) |
|---|---|---|---|
| MW 540 | 50 | 0 | 0.27 |
| HtpG + MW 540 | 50 | 0.537 | 0.12 |
| HtpG + MW 540 | 50 | 0.0537 | 0.27 |
| HtpG + MW 540 | 50 | 0.00537 | 0.26 |

TABLE 3

| Sample | MW 540 Concentration (µg/mL) | Protein Concentration (mg/mL) | $LC_{50}$ (µg/mL MW 540) |
|---|---|---|---|
| MW 540 | 50 | 0 | 0.35 |
| DnaK + MW 540 | 50 | 1.40 | 0.11 |
| HtpG + MW 540 | 50 | 0.940 | 0.14 |
| HtpG + DnaK + MW 540 | 50 | 2.34 | 0.08 |

TABLE 4

| Sample | MW 540 Concentration (µg/mL) | Protein Concentration (mg/mL) | $LC_{50}$ (µg/mL MW 540) |
|---|---|---|---|
| MW 540, unheated | 50 | 0 | 0.43 |
| HtpG + MW 540, heated | 50 | 5 | 0.14 |
| DnaK + MW 540, heated | 50 | 5 | 0.23 |
| HtpG, heated | 0 | 5 | No Activity |
| DnaK, heated | 0 | 5 | No Activity |
| HtpG and DnaK, unheated | 0 | 10 | No Activity |

Combining both HtpG and DnaK with MW 540 resulted in the highest activity. In addition, HtpG and DnaK did not show insecticidal activity on their own regardless of heat treatment.

These results indicate at least the following:

An insecticidal conjugate can be formed between MW 540 and a protein or protein-like molecule having one or more thiol functional groups.

It will be understood that particular embodiments described herein are shown by way of illustration and not as limitations of the invention. The principal features of this invention can be employed in various embodiments without departing from the scope of the invention. Those skilled in the art will recognize or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Deposit of Biological Material

The following biological material has been deposited under the terms of the Budapest Treaty with the Agricultural Research Culture Collection (NRRL), 1815 N. University Street, Peoria, Ill. 61604 USA, and given the following number:

| Deposit | Accession Number | Date of Deposit |
|---|---|---|
| *Burkholderia* sp. A396 | NRRL B-50319 | Sep. 15, 2009 |

The strain has been deposited under conditions that assure that access to the culture will be available during the pendency of this patent application to one determined by the Commissioner of Patents and Trademarks to be entitled thereto under 37 C.F.R. § 1.14 and 35 U.S.C. § 122. The deposit represents a substantially pure culture of the deposited strain. The deposit is available as required by foreign patent laws in countries wherein counterparts of the subject application, or its progeny are filed. However, it should be understood that the availability of a deposit does not constitute a license to practice the subject invention in derogation of patent rights granted by government action.

What is claimed is:

1. A method for increasing insecticidal activity of FR901228 comprising:
conjugating the FR901228 with the protein HtpG to form a conjugated molecule, wherein HtpG comprises at least one thiol functional group in its chemical structure, and wherein the FR901228 and the at least one thiol functional group are linked via at least one disulfide bond, and wherein said conjugated molecule exhibits increased insecticidal activity as compared to FR901228 alone.

2. The method of claim 1, wherein said FR901228 is derived or isolated from one or more microbes or *E. coli*.

3. The method of claim 2, wherein the one or more microbes comprise *Chromobacterium* sp. or *Burkholderia* sp.

4. The method of claim 3, wherein said *Chromobacterium* sp. is *Chromobacterium violaceum* WB968 strain.

5. The method of claim 3, wherein said *Burkholderia* sp. is *Burkholderia* A396 NRRL Accession No. B-50319.

6. The method of claim 1, wherein said FR901228 is chemically synthesized.

7. A method for increasing insecticidal activity of FR901228 comprising:
conjugating the FR901228 with the protein Dnak to form a conjugated molecule, the DnaK comprising a thiol functional group in its chemical structure, and wherein the FR901228 and the thiol function group are linked via at least one disulfide bond, and wherein said conjugated molecule exhibits increased insecticidal activity as compared to FR901228 alone.

8. The method of claim 7, wherein the FR901228 is derived or isolated from one or more microbes or *E. coli*.

9. The method of claim 7, wherein the one or more microbes comprise *Chromobacterium* sp. or *Burkholderia* sp.

10. The method of claim 9, wherein said *Chromobacterium* sp. is *Chromobacterium violaceum* WB968 strain.

11. The method of claim 3, wherein the *Burkholderia* sp. is *Burkholderia* A396 NRRL Accession No. B-50319.

12. The method of claim 7, wherein the FR901228 is chemically synthesized.

13. A method for increasing insecticidal activity of FR901228 comprising:
conjugating the FR901228 with the protein HtpG and/or the protein DnaK via at least one disulfide bond to form a conjugated molecule, and wherein said conjugated molecule exhibits increased insecticidal activity as compared to FR901228 alone.

14. The method of claim 13, wherein the FR901228 is derived or isolated from one or more microbes or *E. coli*.

15. The method of claim 13, wherein the one or more microbes comprise *Chromobacterium* sp. or *Burkholderia* sp.

16. The method of claim 15, wherein said *Chromobacterium* sp. is *Chromobacterium violaceum* WB968 strain.

17. The method of claim 15, wherein the *Burkholderia* sp. is *Burkholderia* A396 NRRL Accession No. B-50319.

18. The method of claim 13, wherein the FR901228 is chemically synthesized.

\* \* \* \* \*

SEQUENCE LISTING

```
<160> NUMBER OF SEQ ID NOS: 2

<210> SEQ ID NO 1
<211> LENGTH: 632
<212> TYPE: PRT
<213> ORGANISM: Burkholderia rinojensis A396

<400> SEQUENCE: 1

Met Thr Gln Gln Thr Met Ser Phe Gln Ala Glu Val Lys Gln Leu Leu
1               5                   10                  15

His Leu Met Ile His Ser Leu Tyr Ser Asn Lys Glu Ile Phe Leu Arg
                20                  25                  30

Glu Leu Val Ser Asn Ala Ser Asp Ala Ala Asp Lys Leu Arg Phe Glu
            35                  40                  45

Ala Leu Glu Asn Gly Ala Leu Tyr Glu Asn Asp Pro Asn Leu Arg Ile
        50                  55                  60

Arg Ile Gly Phe Asp Pro Ala Ala Arg Thr Leu Thr Ile Asp Asp Asn
65                  70                  75                  80

Gly Ile Gly Met Ser Arg Asp Glu Ala Ile Ala Asn Leu Gly Thr Ile
                85                  90                  95

Ala Arg Ser Gly Thr Lys Glu Phe Phe Ser Lys Leu Ser Gly Asp Gln
            100                 105                 110

Gln Lys Asp Ala Ala Leu Ile Gly Gln Phe Gly Val Gly Phe Tyr Ser
        115                 120                 125

Gly Phe Ile Val Ala Asp Arg Ile Thr Val Glu Thr Arg Arg Ala Gly
    130                 135                 140

Leu Pro Ala Ser Glu Gly Val Arg Trp Glu Ser Gly Gly Glu Gly Asp
145                 150                 155                 160

Phe Ser Ile Asp Ala Ile Glu Arg Ala Ala Arg Gly Thr Thr Ile Thr
                165                 170                 175

Leu His Leu Arg Glu Gly Glu Asp Glu Leu Leu Ser Ala His Arg Leu
            180                 185                 190

Lys Ser Ile Val Arg Lys Tyr Ser Asp His Val Ala Leu Pro Ile Leu
        195                 200                 205

Met Gln Gln Glu Ala Trp Asp Ala Glu Lys Gly Glu Met Val Ala Lys
    210                 215                 220

Asp Glu Asp Glu Thr Val Asn Gln Ala Ser Ala Leu Trp Thr Arg Ala
225                 230                 235                 240
```

Lys Ser Glu Ile Thr Asp Glu Gln Tyr Gln Gln Phe Tyr Gln His Leu
            245                 250                 255

Ala His Asp His Gln Asn Pro Leu Ala Trp Thr His Asn Arg Val Glu
        260                 265                 270

Gly Arg Ser Glu Tyr Thr Gln Leu Leu Tyr Val Pro Ser His Ala Pro
        275                 280                 285

Phe Asp Leu Trp Asn Arg Asp Tyr Arg Gly Gly Lys Leu Tyr Val
290                 295                 300

Lys Arg Val Phe Ile Met Asp Asp Ala Glu Leu Leu Pro Gln Tyr
305                 310                 315                 320

Leu Arg Phe Val Lys Gly Val Val Asp Ser Asp Leu Pro Leu Asn
            325                 330                 335

Val Ser Arg Glu Ile Leu Gln Glu Ser Arg Asp Val Lys Ala Ile Arg
            340                 345                 350

Glu Gly Val Thr Lys Arg Ala Leu Ser Met Leu Glu Glu Leu Ala Asn
        355                 360                 365

Ala Glu Asp Asp Ala Gly Lys Glu Gln Tyr Arg Thr Phe Trp Ser Ala
370                 375                 380

Phe Gly Gln Val Leu Lys Glu Gly Val Gly Glu Asp Gln Ala Asn Arg
385                 390                 395                 400

Glu Arg Val Ala Lys Leu Val Arg Phe Ala Ser Thr His Gly Gly Thr
            405                 410                 415

Asp Ala Gln Asp Val Ser Leu Ala Asp Tyr Val Ala Arg Met Lys Pro
        420                 425                 430

Glu Gln Thr Arg Ile Tyr Tyr Val Thr Ala Asp Thr Trp Gln Ala Ala
        435                 440                 445

Thr His Ser Pro His Leu Glu Val Phe Arg Lys Lys Gly Val Glu Val
450                 455                 460

Leu Leu Leu Thr Asp Arg Val Asp Glu Trp Met Leu Ser Tyr Leu Gln
465                 470                 475                 480

Glu Phe Asp Gly Lys Pro Leu Ala Ser Val Ala Arg Gly Asp Leu Asp
            485                 490                 495

Leu Gly Ala Leu Asp Asp Ala Glu Lys Lys Ala Gln Glu Glu Thr Gly
        500                 505                 510

Glu Ala Phe Lys Pro Leu Val Glu Lys Met Lys Glu Ala Leu Gly Asp
    515                 520                 525

Lys Ala Lys Asp Val Arg Val Thr Phe Arg Leu Thr Asp Ser Pro Ser
530                 535                 540

Cys Leu Val Ala Asp His Asp Met Ser Gly Tyr Leu Gln Arg Met
545                 550                 555                 560

Leu Lys Ala Ala Gly Gln Ser Gly Pro Ala Met Gln Pro Ile Leu Glu
            565                 570                 575

Val Asn Pro Glu His Pro Leu Val Lys Gln Leu Gln Ala Asp Ser Pro
        580                 585                 590

Glu Phe Gly Asp Trp Cys His Leu Leu Phe Asp Gln Ala Leu Leu Ala
        595                 600                 605

Glu Gly Gly Ala Leu Glu Asp Pro Ala Ser Phe Val Lys Arg Thr Asn
610                 615                 620

Thr Leu Leu Leu Ser Arg Ala Ala
625                 630

<210> SEQ ID NO 2
<211> LENGTH: 648
<212> TYPE: PRT

-continued

<213> ORGANISM: Burkholderia rinojensis A396

<400> SEQUENCE: 2

```
Met Gly Lys Ile Ile Gly Ile Asp Leu Gly Thr Thr Asn Ser Cys Val
  1               5                  10                  15

Ala Val Met Glu Gly Asn Gln Val Lys Val Ile Glu Asn Ser Glu Gly
             20                  25                  30

Ala Arg Thr Thr Pro Ser Ile Ile Ala Tyr Met Asp Asp Asn Glu Val
         35                  40                  45

Leu Val Gly Ala Pro Ala Lys Arg Gln Ser Val Thr Asn Pro Arg Asn
     50                  55                  60

Thr Leu Phe Ala Val Lys Arg Leu Ile Gly Arg Arg Phe Glu Glu Lys
 65                  70                  75                  80

Glu Val Gln Lys Asp Ile Gly Leu Met Pro Tyr Ala Ile Ile Lys Ala
                 85                  90                  95

Asp Asn Gly Asp Ala Trp Val Glu Ala His Gly Asp Lys Leu Ala Pro
            100                 105                 110

Pro Gln Val Ser Ala Glu Val Leu Arg Lys Met Lys Lys Thr Ala Glu
        115                 120                 125

Asp Tyr Leu Gly Glu Pro Val Thr Glu Ala Val Ile Thr Val Pro Ala
    130                 135                 140

Tyr Phe Asn Asp Ser Gln Arg Gln Ala Thr Lys Asp Ala Gly Arg Ile
145                 150                 155                 160

Ala Gly Leu Glu Val Lys Arg Ile Ile Asn Glu Pro Thr Ala Ala Ala
                165                 170                 175

Leu Ala Phe Gly Leu Asp Lys Ala Glu Lys Gly Asp Arg Lys Ile Ala
            180                 185                 190

Val Tyr Asp Leu Gly Gly Gly Thr Phe Asp Val Ser Ile Ile Glu Ile
        195                 200                 205

Ala Asp Val Asp Gly Glu Met Gln Phe Glu Val Leu Ser Thr Asn Gly
    210                 215                 220

Asp Thr Phe Leu Gly Gly Glu Asp Phe Asp Gln Arg Ile Ile Asp Tyr
225                 230                 235                 240

Ile Ile Gly Glu Phe Lys Lys Glu Gln Gly Val Asp Leu Ser Lys Asp
                245                 250                 255

Val Leu Ala Leu Gln Arg Leu Lys Glu Ala Ala Glu Lys Ala Lys Ile
            260                 265                 270

Glu Leu Ser Ser Gly Gln Gln Thr Glu Ile Asn Leu Pro Tyr Ile Thr
        275                 280                 285

Ala Asp Ala Ser Gly Pro Lys His Leu Asn Leu Lys Ile Thr Arg Ala
    290                 295                 300

Lys Leu Glu Ala Leu Val Glu Glu Leu Val Glu Arg Thr Ile Glu Pro
305                 310                 315                 320

Cys Arg Ile Ala Ile Lys Asp Ala Gly Val Lys Val Ser Asp Ile Asp
                325                 330                 335

Asp Val Ile Leu Val Gly Gly Gln Thr Arg Met Pro Lys Val Leu Glu
            340                 345                 350

Lys Val Lys Glu Phe Phe Gly Lys Asp Pro Arg Arg Asp Val Asn Pro
        355                 360                 365

Asp Glu Ala Val Ala Val Gly Ala Ala Ile Gln Gly Gln Val Leu Ser
    370                 375                 380

Gly Asp Arg Lys Asp Val Leu Leu Leu Asp Val Thr Pro Leu Ser Leu
385                 390                 395                 400
```

-continued

```
Gly Ile Glu Thr Leu Gly Gly Val Met Thr Lys Met Ile Asn Lys Asn
            405             410                 415

Thr Thr Ile Pro Thr Lys His Ala Gln Val Tyr Ser Thr Ala Asp Asp
            420             425                 430

Asn Gln Gly Ala Val Thr Ile Lys Val Phe Gln Gly Glu Arg Glu Met
            435             440                 445

Ala Ala Gly Asn Lys Leu Leu Gly Glu Phe Asn Leu Glu Gly Ile Pro
    450             455                 460

Pro Ala Pro Arg Gly Val Pro Gln Ile Glu Val Thr Phe Asp Ile Asp
465             470                 475                 480

Ala Asn Gly Ile Leu His Val Gly Ala Lys Asp Lys Ala Thr Gly Lys
            485             490                 495

Glu Asn Lys Ile Thr Ile Lys Ala Asn Ser Gly Leu Ser Glu Ala Glu
            500             505                 510

Ile Asp Gln Met Ile Lys Asp Ala Glu Ala Asn Ala Ala Glu Asp His
            515             520                 525

Lys Leu Arg Glu Leu Ala Asp Ser Arg Asn Gln Gly Asp Ala Leu Val
            530             535                 540

His Ser Thr Lys Lys Ala Val Ala Glu Tyr Gly Asp Lys Leu Asp Ala
545             550                 555                 560

Gly Glu Lys Asp Lys Ile Glu Ala Ala Leu Lys Glu Leu Glu Asp Val
                565             570                 575

Leu Lys Asn Thr Ser Ala Asp Lys Ala Ala Ile Asp Ala Lys Ile Glu
            580             585                 590

Ala Leu Ser Thr Ala Ser Gln Lys Leu Gly Glu Lys Met Tyr Ala Asp
            595             600                 605

Met Gln Ala Gln Gln Ala Gly Ala Ala Gly Ala Ala Gly Ala Ala Glu
            610             615                 620

Gly Ala Ala His Gly Gly Ala Gln Gln Ala Asp Asp Val Val Asp Ala
625             630                 635                 640

Asp Phe Lys Glu Val Lys Lys Asp
            645
```